Patented Feb. 21, 1933

1,898,885

UNITED STATES PATENT OFFICE

JOHN A. MORAN, OF NEW YORK, N. Y.

FOOD

No Drawing. Application filed April 19, 1929, Serial No. 356,606. Renewed October 13, 1932.

This invention relates in general to food products and more particularly has reference to a food beverage containing yeast in a form lacking its characteristic taste, and to methods for preparing the same.

The therapeutic and medicinal properties of yeast have been well recognized and consequently the demand for yeast has been greatly increased. Many people, however, find it very objectionable to eat or drink yeast containing compounds because of the unpleasant natural taste of yeast.

Many attempts have been made to modify the characteristic flavor of yeast by treating the same with various compounds. Most of the processes heretofore used for removing or masking the characteristic taste of yeast have been found to be disadvantageous in that the desirable properties of the yeast have been destroyed or deleteriously affected.

It would be particularly desirable to have yeast in a form in which the characteristic taste is eliminated or masked to such an extent that it would not be objectional to the taste and yet permit the yeast to retain all of its beneficial properties.

A major object of this invention is to provide a yeast containing food product in which the yeast is so incorporated as to lack its characteristic unpalatable taste.

Another object of this invention is to provide a food beverage consisting of milk in which is suspended yeast and in which a carbohydrate is present in a sufficient quantity to react with a portion of the yeast to form compounds tending to mask the taste of the yeast.

Still another object of this invention is to provide a food beverage consisting of milk, yeast and sugar, and certain reaction products thereof.

A further object of this invention is to devise a method of preparing a food beverage containing yeast and in which the characteristic taste of the yeast is masked.

With these and other objects in view, which may be incident to my improvement, the invention comprehends the concept of preparing a food drink composed of milk, carbohydrate and yeast together with the reaction products resulting from an incomplete fermentation of the carbohydrate content of the mixture, the final product containing all of the vitamins and enzymes present in the several raw materials which facilitate body metabolism.

Certain carbohydrates, including both aldoses and ketoses, depending upon the stereochemical configuration of the molecule, are fermented by the amylolytic enzyme zymase which is present in yeast. The fermentation results in a breaking down of the carbohydrate into an alcohol and carbon dioxide, as represented by the effect of zymase and dextrose or grape sugar:

$$C_6H_{12}O_6 \rightarrow 2C_2H_5OH + 2CO_2.$$

Polysaccharides such as sucrose are not fermented by zymase alone, but under the influence of ordinary yeast, which contains the enzyme invertase in addition to zymase, the carbohydrates are inverted, resulting in the production of a mixture of dextrose and levulose, which is readily fermentable by zymase.

Carbon dioxide has the property of masking the taste of substances when taken into the mouth simultaneously with the substances. For instance, distasteful medicinal compounds such as oleum ricini, when taken with liquids containing carbon dioxide, are much more palatable. It appears that the carbon dioxide affects the sensitive portions of the mouth, instrumental in producing the sensation of taste, to such an extent as to mask the taste of certain ordinarily distasteful substances. Yeast is one of the substances whose taste is eliminated or masked by carbon dioxide to such an extent as to be unobjectionable.

In accordance with the present invention, yeast is suspended in a liquid vehicle, which has nutritive and particularly vitamic values, and carbon dioxide is generated in situ in sufficient quantities to remove or mask the taste of the yeast. The generation of carbon dioxide is effected by the action of the enzyme zymase present in yeast on certain carbohydrates. As hereinbefore pointed out, certain mono-saccharides and inverted polysaccharides are fermented by zymase to produce alcohol and carbon dioxide, as represented by

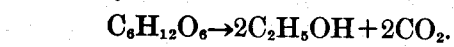
$$C_6H_{12}O_6 \rightarrow 2C_2H_5OH + 2CO_2.$$

To provide a substance which is readily fermentable, carbohydrates are introduced into the vehicle. The carbohydrates employed may be dextrose, levulose, d-mannose, sucrose or other carbohydrates or mixture of carbohydrates capable of undergoing fermentation with the resultant production of carbon dioxide. It, of course, is obvious that substances which upon fermentation produce compounds in the resultant product that are toxic or tend to detrimentally affect the properties of the beverage should be avoided.

In the preferred embodiment of my invention milk is employed as the vehicle because of its nutritive value. The food beverage may be prepared by forming a solution of milk and the fermentable sugar, and then treating the solution with yeast. To carry out the process about 10 parts by weight of d-glucose (dextrose) or other fermentable sugar is dissolved in about 1000 parts by weight of raw cow's milk, or other milk found suitable for the purpose. The milk, or other liquid vehicle, is vigorously stirred or agitated while the carbohydrate is added to prevent the latter agglomerating or lumping and to effect complete dissolution of the carbohydrate in the vehicle. The solution containing the carbohydrate is then heated by any suitable means to a temperature of approximately sixty degrees centigrade (60° C.), and is maintained at this temperature for a period of forty-five minutes. Maintaining the solution at this temperature for the time period specified, substantially inactivates the milk without however initiating any substantial proteolytic conversion.

After inactivation, the solution is cooled to a temperature of about forty degrees centigrade (40° C.). A small portion of the inactivated solution is then separated and treated with about 6 parts by weight of yeast. The yeast is first mashed and then thoroughly dispersed in the separated portion of the vehicle to form an homogeneous suspension of the yeast cells. The suspension of yeast is then introduced into the bulk of the solution and the entire mixture is vigorously agitated to insure a complete distribution of yeast cells throughout the mixture.

The mixture may be placed in a closed container and maintained at a temperature of about thirty-seven and one-half degrees centigrade (37½° C.) for approximately eighteen hours. This incubation promotes fermentation of the carbohydrate contained in the mixture, with the resultant production of carbon dioxide and alcohol. As hereinbefore pointed out the carbon dioxide tends to eliminate or mask the taste of the yeast when the beverage is taken into the mouth. After the beverage has been incubated for the proper length of time the same is refrigerated to prevent further fermentation and is then ready for use.

If desired, the solution after being mixed with the yeast may be run into bottles and capped with the widely used metallic crimp caps. After bottling, the bottles may be placed in an incubator and incubated at a temperature of about thirty-seven and one-half degrees centigrade (37½° C.) for approximately eighteen hours to bring about fermentation and the resultant production of carbon dioxide in the beverage. After treatment, the bottles are removed, chilled to prevent further fermentation and packed for distribution.

In order to retain all of the beneficial properties of the food beverage, it is essential that the fermentation be incomplete, therefore it is necessary that fermentation, other than that effected during the eighteen hour incubation period, be prevented. The fermentation may be maintained incomplete by subjecting the beverage to a sufficiently low temperature which will effectively prevent the catalytic action of the fermentation principle, or by any other suitable means which will inhibit fermentation.

For making small quantities of the beverage, ten grams of dextrose or other fermentable carbohydrate may be dissolved in one liter of raw milk. The solution should then be heated at sixty degrees centigrade (60° C.) for about forty-five minutes, and then cooled to about forty degrees centigrate (40° C.) About fifty cc of the inactivated mixture should then be removed and treated with about six grams of yeast. After the yeast is thoroughly dispersed the suspension should be added to the bulk of the sweetened milk and the entire mixture agitated.

This mixture may then be placed in a bottle or other suitable container and incubated for about eighteen hours at thirty-seven and one-half degrees centigrade (37½° C.), after which it may be cooled and used as a beverage.

It may easily be understood that the process herein described is susceptible to both continuous and intermittent operation and thus may be modified to conform with the demand for the product.

The fermentation process is controlled so that carbon dioxide just sufficient for masking the taste of the yeast will be generated. As in other fermentation processes, there is a multiplication of yeast cells which increases the effectiveness of the final beverage for certain medicinal purposes. It will be found that if the process is controlled as herein set forth, the product will contain substantially the original vitamins of the milk together with the enzymes present in yeast cells which aid metabolism. The presence of the yeast cells in the beverage renders it highly effective for correcting certain functional disturbances of the gastro-intestinal tract of some individuals, and the presence of enzymes is generally considered to facilitate body metabolism. While having the property of masking the taste of yeast, carbon dioxide also has the properties of removing the flatness of milk beverages and stimulating body functions.

If desired, the product can be flavored with various substances to suit all tastes.

While I have described the preferred embodiment of my invention, I wish it to be clearly understood that I have done so purely by way of example, as it is apparent that many changes and variations in ingredients as well as proportions may be made therein by those skilled in the art without departing from the spirit of the invention, or exceeding the scope of the appended claims.

I claim:

1. A process of preparing food beverages comprising forming a solution of a fermentable carbohydrate in milk, heating the solution to 60° C. for 45 minutes, cooling to 40° C., introducing yeast into the solution, immediately placing the mixture in a closed container and maintaining said mixture in the closed container for 18 hours at 37½° C.

2. A process of preparing food beverages comprising forming a solution of a fermentable carbohydrate in milk, heating the solution at 60° C. for 45 minutes, cooling to 40° C., introducing yeast into the solution, immediately placing the mixture in a closed container and maintaining said mixture in the closed container for approximately 18 hours at 37½° C., and refrigerating the mixture.

In testimony whereof I affix my signature.

JOHN A. MORAN.